United States Patent [19]

Recker et al.

[11] Patent Number: 4,937,462
[45] Date of Patent: Jun. 26, 1990

[54] NO BREAK POWER TRANSFER CONTROL FOR A VSCF POWER GENERATING SYSTEM

[75] Inventors: Bradley J. Recker, Rockford, Ill.; Christopher J. Rozman, Delavan, Wis.; Derrick I. Roe, Rockford, Ill.

[73] Assignee: Sundstrand Corporation, Rockford, Ill.

[21] Appl. No.: 300,820

[22] Filed: Jan. 23, 1989

[51] Int. Cl.⁵ .......................... H02J 9/06; H02J 9/00
[52] U.S. Cl. ........................................ 307/19; 307/46; 307/87; 363/95
[58] Field of Search ....................... 307/43–46, 307/64–66, 84–87, 125, 129, 18–20; 364/492; 363/40, 49, 95, 109; 323/237, 241, 246

[56] References Cited

U.S. PATENT DOCUMENTS

| 3,932,764 | 1/1976 | Corey | 307/85 |
|---|---|---|---|
| 4,516,035 | 5/1985 | Rhoads et al. | 307/66 |
| 4,572,961 | 2/1986 | Borger | 290/4 R |
| 4,695,776 | 9/1987 | Dishner et al. | 318/14 |
| 4,703,193 | 10/1987 | Kawabata | 307/66 |
| 4,731,690 | 3/1988 | Beg et al. | 361/78 |
| 4,782,241 | 11/1988 | Baker et al. | 307/66 |

OTHER PUBLICATIONS

Mehl et al., "A Minimum Interruption AC Electric Power Generating System for Avionics", presented by the American Institute of Aeronautics and Astronautics, 1984.

Primary Examiner—Philip H. Leung
Assistant Examiner—David Osborn
Attorney, Agent, or Firm—Marshall, O'Toole, Gerstein, Murray & Bicknell

[57] ABSTRACT

In aircraft applications, it may be necessary or desirable to transfer one or more loads between a variable speed, constant frequency (VSCF) power generating system and a further source of AC power. Prior controls for effecting such transfer, however, have been unduly complex. In order to overcome this problem, a control for a VSCF system senses the deviation of a parameter of the power developed by an inverter of the system relative to a parameter of the power developed by an AC power source and controls the inverter in accordance with such deviation to cause the parameter of the power developed thereby to approach the parameter of the power developed by the AC power source. The inverter and the AC power source are connected in parallel across one or more loads when the parameter deviation is within a certain range. Either the inverter or the AC power source is thereafter disconnected a certain time after the two were connected in parallel to complete the power transfer.

3 Claims, 4 Drawing Sheets

NO BREAK POWER TRANSFER CONTROL FOR A VSCF POWER GENERATING SYSTEM

TECHNICAL FIELD

The present invention relates generally to power system controls, and more particularly to a control which transfers a load between a source of AC power and a variable speed, constant frequency (VSCF) generating system without significant disruption in load current.

BACKGROUND ART

There are numerous applications where it is necessary or desirable to disconnect one or more loads from one power supply and to connect the load(s) to another power supply with minimum disruption in the load current(s). In aircraft and aerospace applications, a load transfer may be required between power sources external to the aircraft and on-board the aircraft or between separate on-board power sources. Prior on-board power sources are typically of the constant speed type having a hydromechanical constant speed drive which is coupled to the engine of the aircraft and which converts the variable speed motive power produced by the engine into constant speed motive power. A synchronous generator is coupled to the output of the constant speed drive and converts the constant speed motive power into constant frequency AC power for the loads.

More recently, attempts have been made at designing a practical power source which converts variable speed motive power into constant frequency electrical power without the use of hydromechanical components in the constant speed drive. For example, Dishner et al. U.S. Pat. No. 4,695,776 (Sundstrand) and Borger U.S. Pat. No. 4,572,961 disclose electrically compensated constant speed drives which include a mechanical differential having a first input coupled to the output of the prime mover and an output coupled to a synchronous generator. A speed compensation link in the form of first and second permanent magnet machines interconnected by a power converter is coupled between the prime mover and a second input of the differential. The power flow between the permanent magnet generators is controlled so that the required compensating speed is provided to the second differential input shaft to maintain the output shaft at a constant speed.

An alternative to the foregoing sources that does not use a constant speed drive is referred to as a variable speed, constant frequency (VSCF) generating system which includes a synchronous generator coupled directly to the aircraft engine and a power converter which converts the variable frequency output of the generator into constant frequency power for the loads. In multiple engine aircraft, each engine typically drives a separate VSCF system (sometimes referred to as a "channel") and the system outputs are coupled to a load bus through contactors. Interest in VSCF systems has increased of late owing to the push to design "all electric" aircraft in which the use of mechanical, hydromechanical and hydraulic components is minimized.

In a multiple-channel VSCF system of the above type, it may be necessary to change the source of power to the load bus from one channel to another or between an external AC source, such as a ground power cart, and one of the channels.

Corey U.S. Pat. No. 3,932,764 discloses a method and apparatus for transferring an electrical load from a utility AC power source to an inverter. The utility AC power source and the inverter are momentarily connected in parallel across the load and the inverter output voltage and phase are controlled to null the current provided by the AC source. Thereafter, the AC source is disconnected from the load to complete the power transfer

SUMMARY OF THE INVENTION

In accordance with the present invention, a control for a VSCF power generating system operates the system to permit load transfer between the VSCF system and an AC source with minimal interruption in the power provided to the load.

More specifically, the control senses a parameter of the power developed by an N phase inverter of the VSCF system relative to a corresponding parameter of the power developed by the AC power source to derive a parameter deviation signal. The inverter is controlled to cause the parameter of the power developed thereby to approach the parameter of the power developed by the AC power source. Once the parameters are within a certain range, the inverter and the AC power source are connected in parallel across the load. Thereafter, the inverter or the AC power source is disconnected so that the load transfer is effected In the preferred embodiment, the deviation of the phase and frequency of the voltage developed by the inverter relative to the voltage developed by the AC power source are sensed and signals representative thereof are summed. The summed signals are provided to a controlled oscillator which is in turn coupled to a counter. The output of the counter is coupled to one or more memories which store control waveforms for controlling the N phases of the inverter. The frequency at which successive memory locations are accessed to produce the control waveforms is controlled by the summed phase and frequency deviation signals so that the phase angle and frequency of the power developed by the inverter approaches the phase angle and frequency of the power developed by the AC power source. Once the phase angle and frequency of the VSCF system and the AC power source are within predetermined ranges, the system and the source are connected in parallel.

The present control is simple in design, thus leading to improved reliability and effectiveness.

DESCRIPTION OF THE PREFERRED EMBODIMENT

Figure 1:
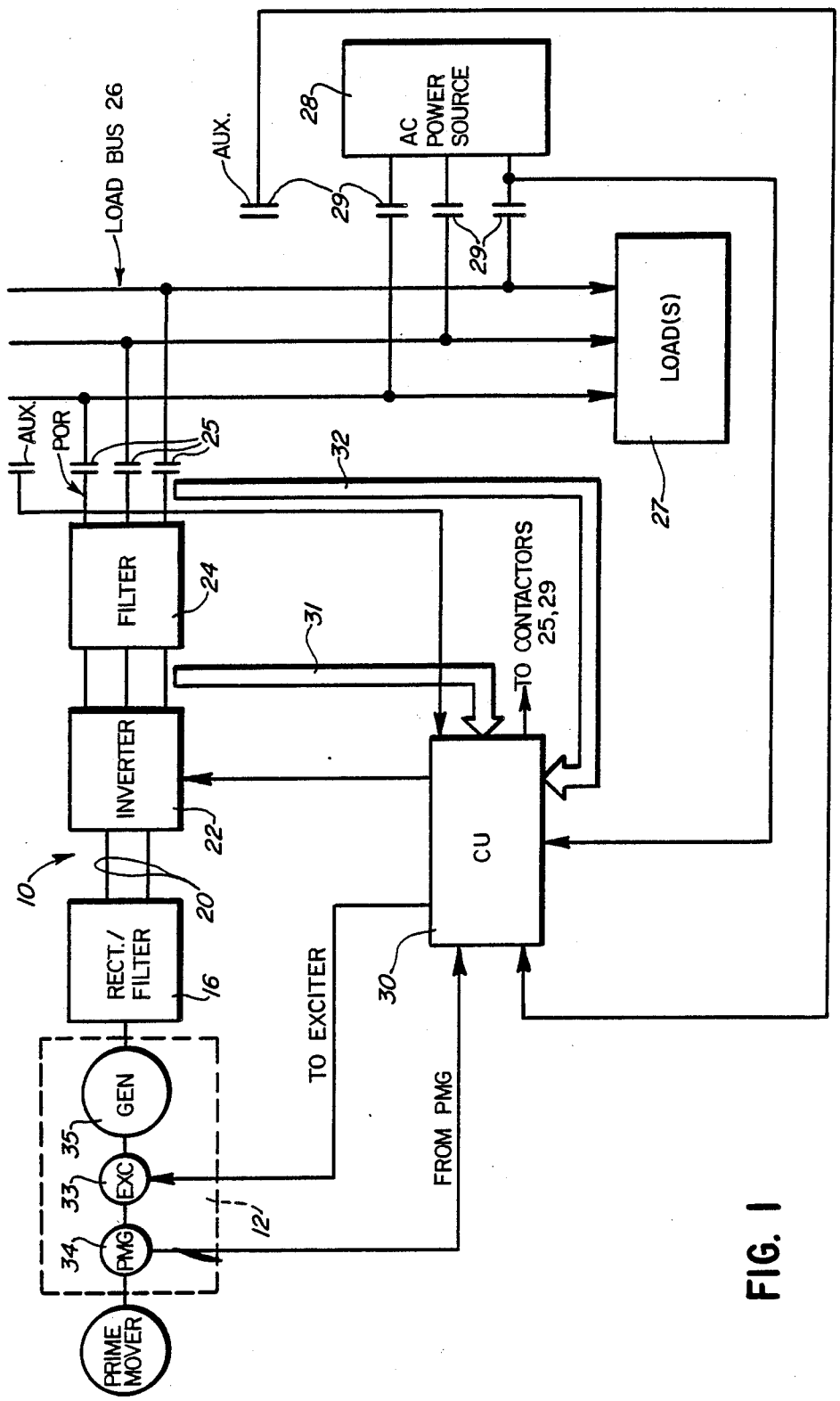
FIG. 1 is a block diagram of a VSCF system incorporating the control of the present invention in conjunction with an AC power source and a load bus.

Referring now to FIG. 1, a variable speed, constant frequency (VSCF) system 10 is illustrated. The VSCF system 10 includes a brushless, synchronous generator 12 driven by a variable speed prime mover 14 which may be, for example, an aircraft jet engine. The generator develops a polyphase, variable frequency AC output which is converted into DC power by a rectifier/filter 16. The resulting DC power is provided over a DC link 20 to a polyphase inverter 22 which converts the DC power into N phase constant frequency AC power. This AC power may be filtered by an optional filter 24 and is provided via a controllable set of contactors 25 to a load bus 26. The load bus 26 is, in turn, coupled to one or more loads 27. The load bus may also receive power developed by another AC power source which is coupled through a further set of controllable contactors 29 to the load bus 26. The AC power source may comprise an external AC source, an on-board AC source such as a further VSCF system, or the like. It should be noted that the arrangement of contactors shown in FIG. 1 is simplified for ease of understanding.

Figure 2:
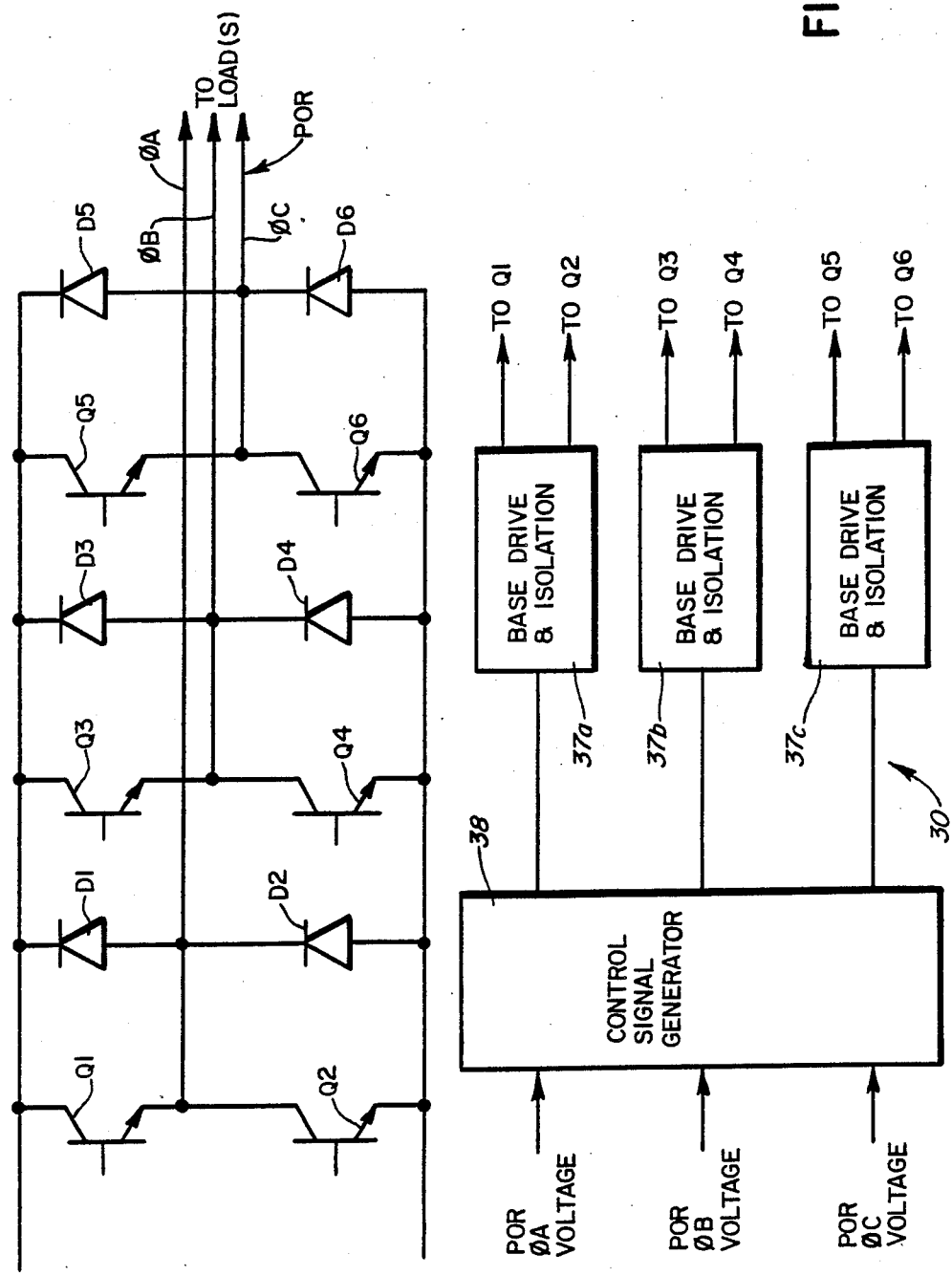
FIG. 2 is a combined schematic and block diagram of the control of the present invention in conjunction with a simplified representation of the inverter shown in FIG. 1.

The inverter 22 includes switches Q1–Q6, shown in FIG. 2, which are controlled by a control unit or CU 30. The CU 30 is responsive to output parameters of the inverter 22, as represented by the open arrow 31, as well as to output parameters at the POR, here shown as being at or near the contactors 25, as represented by the open arrow 32. The CU 30 further controls the current delivered to an exciter 33 of the generator 12. The generator 12 further includes a permanent magnet generator (PMG) 34 which supplies control power to the CU 30 and a main generator portion 35 which includes armature windings in which the generator power is developed.

The contactors 25 and 29 are controlled by the CU 30 to in turn couple the VSCF system 10 in parallel with the AC power source 28 across the load 27. The CU 30 is responsive to a phase of the power developed by the AC source 28, for example phase C, and develops a frequency reference signal as noted in greater detail hereinafter.

Referring specifically to FIG. 2, the switches Q1–Q6 of the inverter 22 are connected in a conventional three-phase bridge configuration together with associated flyback diodes D1–D6. The switches are controlled by base drive signals developed by base drive and isolation circuits 37a–37c. Each base drive and isolation circuit 37a–37c receives a control signal developed by a control signal generator 38 which is shown in greater detail in FIGS. 3 and 4.

It should be noted that the particular inverter topology illustrated in FIG. 2 may be replaced by a different inverter topology. For example, a neutral point clamped inverter could be used, if desired.

Figure 3:
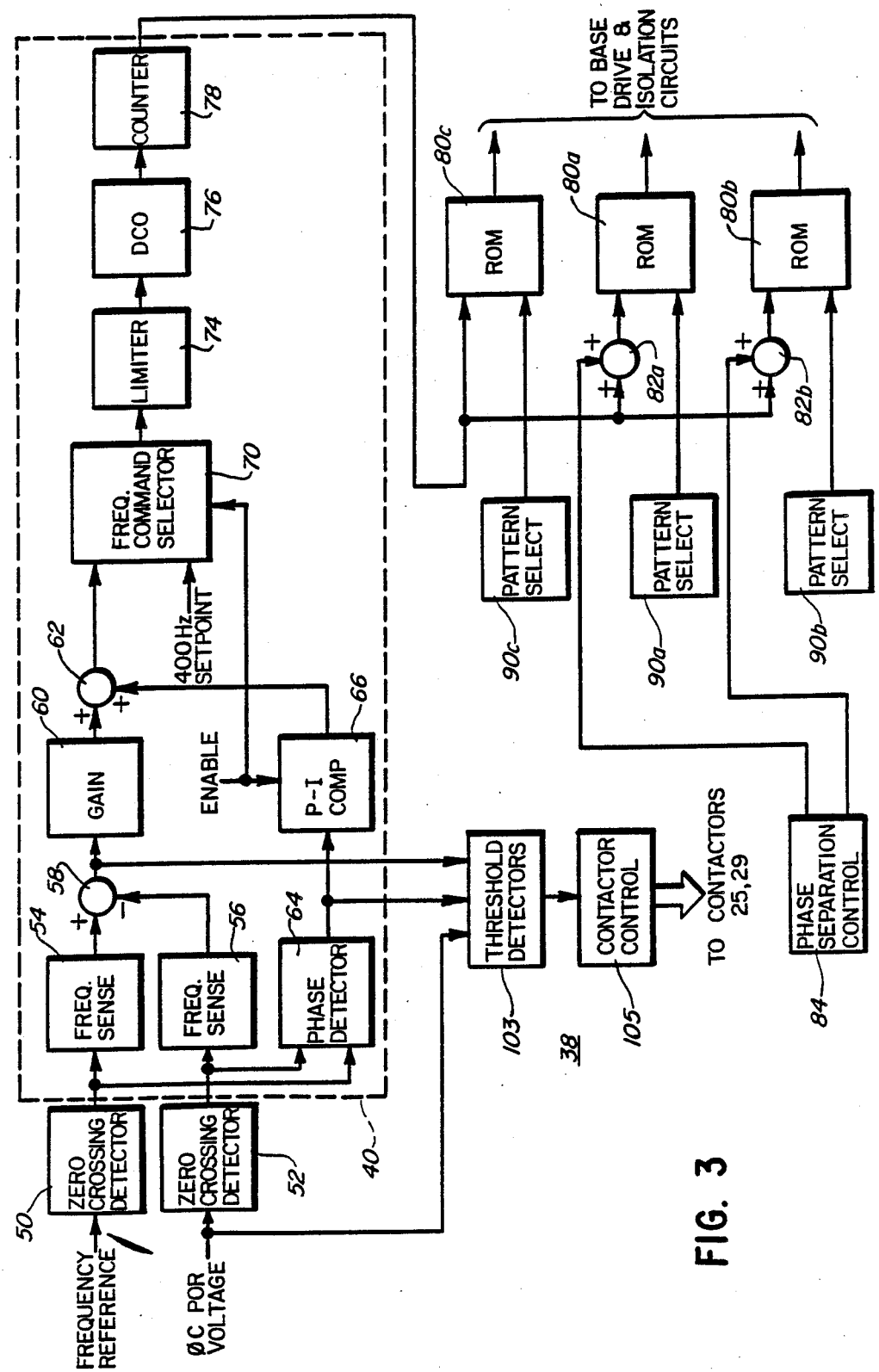
FIG. 3 is a combined schematic and block diagram of a portion of the control signal generator illustrated in block diagram form in FIG. 2.

Referring now to FIG. 3, there is illustrated in greater detail a portion of the control signal generator 38. The control signal generator may be implemented in whole or in part by software or hardware, as desired. The generator 38 includes circuitry 40 for controlling the phase and frequency of the inverter output so that the contactors 25 and 29 can be simultaneously closed to connect the VSCF system 10 and the AC power source 28 in parallel across the load 27 without generation of a significant transient in the power on the load bus 26. Such means comprises first and second zero crossing detectors 50, 52 which are responsive to the frequency reference signal and the phase C voltage at the POR, respectively. The frequency reference signal may represent the voltage on a particular phase of the load bus, for example phase C, in the event that the VSCF system 10 is to be connected in parallel with the AC source 28 or may be an external reference signal. The zero crossing detectors 50, 52 include outputs which are coupled to inputs of frequency sensors 54, 56 having outputs which are in turn coupled to noninverting and inverting inputs, respectively, of a summer 58. The summer 58 develops a deviation signal representing the difference in frequency of the reference signal provided by the CU 30 and the voltage at the point of regulation. This deviation signal is processed by a gain unit 60 and is provided to a first input of a further summer 62.

The signals developed by the zero crossing detectors 50, 52 are further provided to a phase sensor 64 which in turn develops an angular deviation signal representing the phase or angular displacement between the reference signal provided by the CU 30 and the phase C voltage developed at the POR. This angular deviation signal is processed by a gain and compensation unit 66, which may be of the proportional-integral type, and the resulting integrated deviation signal is provided to a second input of the further summer 62. The gain and compensation unit 66 is enabled by an enabling signal which in turn releases the internal integrator of the unit 66 upon issuance of a command to connect the VSCF system 10 in parallel with the AC power source 28 so that the source of power for the load(s) 27 can be transferred therebetween.

The summer 62 develops a summed signal which is provided to a frequency command selector circuit 70 that passes either the output of the summer 62 or a frequency reference signal representing a desired 400 hz. output to a limiter 74. The limiter 74 in turn includes an output coupled to a digitally controlled oscillator (DCO) 76. The DCO 76 develops a clock signal at a frequency proportional to the magnitude of the output of the limiter 74.

The output of the DCO 76 is provided to a counter 78 that in turn develops low order addresses for address inputs of a reference phase memory 80c. Other reference phase memories 80a, 80b receive low order addresses developed by summers 82a, 82b, each having inputs coupled to the output of the counter 78. Each of the memories 80a–80c stores a plurality of pulse width modulated (PWM) inverter control waveforms for one of the inverter phases, although it should be realized that all of the control waveforms could instead be stored in a single memory, if desired. Each PWM waveform is stored as zeros (representing notches) and ones (representing pulses) in successive storage locations of the memories 80a–80c. The frequency at which the successive memory locations are addressed is determined by the frequency of the signal developed by the DCO 76. This accessing frequency in turn determines the phase and frequency of the signals produced by the memories 80a–80c, and thus the phase and frequency of the inverter output.

Each of the summers 82a, 82b receives phase reference signals developed by a phase separation control 84 which is described in greater detail in Rozman et al., copending application Ser. No. 07/285,118, filed Dec. 16, 1989, and entitled "Phase Control for a VSCF System" (Sundstrand) the disclosure of which is hereby incorporated by reference. The reference signals cause the waveforms developed by the memories 80a, 80b to be displaced 120° and 240° relative to the waveform developed at the output of the memory 80c.

Pattern select circuits 90a–90c are coupled to high order address inputs of the memories 80a–80c which in turn determine which PWM waveforms are retrieved therefrom. The pattern select circuits 90 are typically responsive to one or more output parameters of the inverter 22. Representative pattern select circuits are shown in Recker et al., copending application Ser. NO. 07/285,423, filed Dec. 16, 1989, and entitled "Low Distortion Control for a VSCF System" (Sundstrand), the disclosure of which is hereby incorporated by reference.

Figure 4:
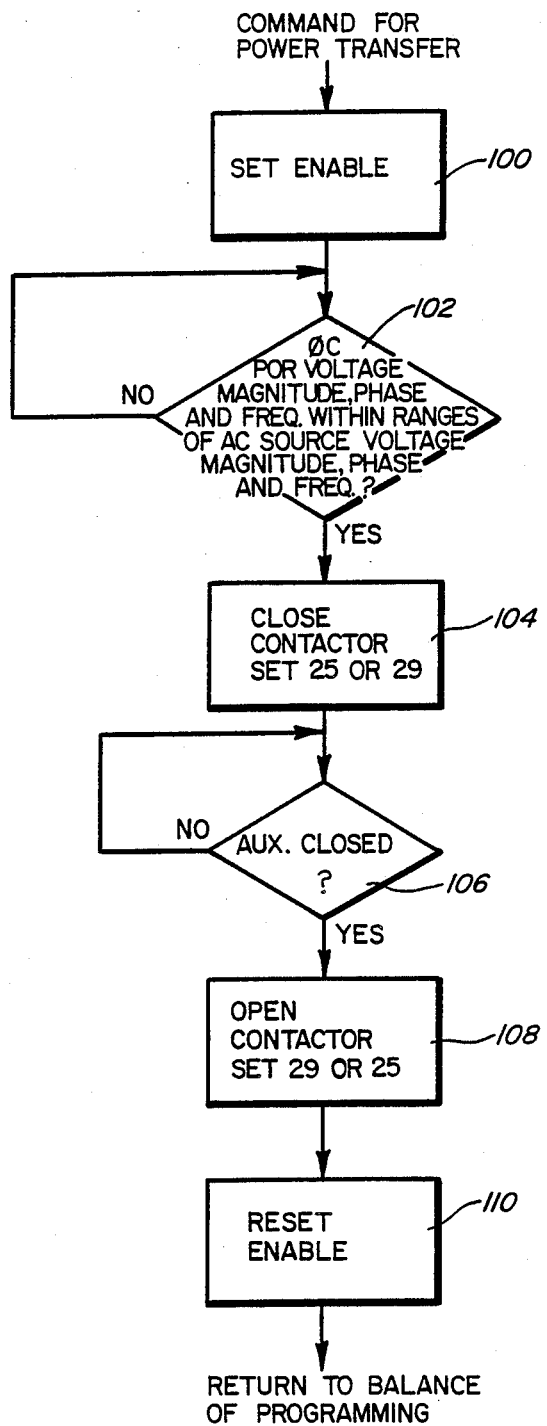
FIG. 4 comprises a flowchart illustrating programming executed by the control limit of FIG. 1.

The operation of the present invention will now be described in conjunction with the flowchart of FIG. 4.

Before a command signal is issued commanding load transfer from the VSCF system 10 to the AC source 28, one of the sets of contactors 25 or 29 is closed and the other is opened so that the VSCF system 10 or the AC power source 28 is connected to the load bus 26. In addition, the frequency selector 70 provides the 400 hz. frequency reference to the limiter 74 and the DCO 76. This causes the storage locations of the memories 80a–80c to be accessed at a frequency which results in generation of 400 hz. power at the inverter output This power is not synchronized to the power developed by the AC source 28.

Upon issuance of a command signal for no-break power transfer, a block 100 sets the enable signal resulting in delivery of the output of the summer 62 to the limiter 74. The limiter 74 thereafter controls the frequency of the output signal developed by the DCO 76 to in turn control the frequency at which successive memory locations in the memories 80a–80c are accessed. The phase angle and frequency of the inverter output are thus controlled to approach the phase and frequency of the power developed by the AC power source 28. In addition, the pattern select circuits 90 select PWM waveforms from the memories to cause the magnitude of the POR voltage to approach the AC source voltage magnitude. Once a block 102 determines from the output of threshold detectors 103 that the phase, frequency and magnitude of the inverter output voltage at the POR are within predetermined ranges of the phase, frequency and magnitude of the voltage developed by the AC source 28, a block 104 causes a contactor control 105 to close the open contactors 25 or 29 to thereby connect the VSCF system 10 in parallel with the AC power source 28.

Following the block 104, a block 106 checks auxiliary contactors AUX of the contactor sets 25 or 29 to ascertain when the contactor set 25 or 29 has closed. Once this determination has been made, a block 108 opens the proper set of contactors 25 or 29 so that the VSCF system 10 or the power source 28 is disconnected from the loads 27. A block 110 then resets the enable signal.

Following the block 110, control returns to the balance of the CU 30 programming.

Summarizing the operation of the control when the loads 27 are to be transferred from the power source 28 to the VSCF system 10, the phase angle of the phase voltages developed at the POR are caused to approach the phase angle of the phase voltages developed by the AC source 28 due to operation of the frequency command selector 70 by the block 100. Once these voltages are within certain phase angle, frequency and magnitude ranges, the contactors 25 are closed by the block 104 so that the VSCF system 10 and the power source 28 are connected in parallel across the loads 27. Once the contactors 25 have closed, as sensed by the block 106, the contactors 29 are opened so that the power source 28 is disconnected from the loads 27. The selector 70 is then operated to cause the POR voltages to be synchronized to the 400 hz. reference signal.

Power transfer from the VSCF system 10 to the power source 28 is identical, except that the operation of the contactor sets 25 and 29 is interchanged.

It can be seen that the VSCF system 10 and the power source 28 are connected in parallel only for the length of time required to sense the closure of the contactor set 25 or 29 and opening of the other set 29 or 25. This period of time, typically on the order of 50–60 milliseconds, is determined by the dynamic response of the control and results in minimal transients in the power applied to the load.

From the foregoing, it can be seen that the control of the present invention is simple in design and does not result in significant transients in the power applied to the loads 27.

While the CU 30 has been described as controlling the contactor sets 25 and 29, it should be noted that the sets may be controlled by separate control units, as desired.

We claim:

1. A control for a variable speed constant frequency (VSCF) power generating system having a polyphase inverter including switches which are controlled to develop N phase output voltages and which is connectable to a load bus through a first set of controllable contactors wherein a polyphase AC power source which develops N phase output voltages is also connectable to the load bus through a second set of controllable contactors, comprising:

first and second zero crossing detectors coupled to corresponding phase output voltages of the inverter and the AC power source;

first and second frequency sensors coupled to the zero crossing detectors which develop first and second frequency signals having magnitudes representing the inverter output voltage frequency and the AC power source output voltage frequency, respectively;

a first summer which sums the frequency signals to derive a frequency deviation signal having a magnitude representing the deviation of the inverter output voltage frequency from the AC power source output voltage frequency;

a phase detector which develops a phase deviation signal representing the deviation of the phase of the inverter output voltage from the phase of the AC power source output voltage;

a second summer coupled to the first summer and the phase detector which sums the frequency and phase deviation signals to produce a summed signal;

a digitally controlled oscillator (DCO) coupled to the second summer which develops a clock signal at a frequency dependent upon the magnitude of the summed signal;

a counter coupled to the DCO which produces an accessing signal from the clock signal;

N memories coupled to the counter, each of which stores a plurality of control signals for controlling at least one of the inverter switches to produce an inverter phase output voltage wherein the phase and frequency of the inverter output is dependent upon the accessing signal;

means for closing the controllable contactors to connect the inverter and the AC power source in parallel to the load bus when the magnitudes of the deviation signals are less than predetermined magnitudes; and means responsive to the closing means for opening one of the first and second controllable contactors to disconnect one of the inverter and the AC power source from the load bus after the two were connected in parallel.

2. A control for a variable-speed constant-frequency (VSCF) power generating system having a polyphase inverter including switches which are controlled to develop N phase output voltages and which is connectable to a load bus through a first set of controllable contactors wherein a polyphase AC power source which develops N phase output voltages is also connectable to the load bus through a second set of controllable contactors, comprising:

first and second zero crossing detectors coupled to corresponding phase output voltages of the inverter and the AC power source;

first and second frequency sensors coupled to the zero crossing detectors which develop first and second frequency signals having magnitudes representing the inverter output voltage frequency and the AC power source output voltage frequency, respectively;

a first summer which sums the frequency signals to derive a frequency deviation signal having a magnitude representing the deviation of the inverter output voltage frequency from the AC power source output voltage frequency;

a phase detector which develops a phase deviation signal representing the deviation of the phase of the inverter output voltage from the phase of the AC power source output voltage;

a second summer coupled to the first summer and the phase detector which sums the frequency and phase deviation signals to produce a summer signal;

a digitally controlled oscillator (DCO) which develops a clock signal at a frequency dependent upon the magnitude of a signal provided to an input thereof;

a selector having a first input coupled to the output of the second summer, a second input which receives a reference signal and an output coupled to the DCO input wherein the selector is operated to couple the reference signal to the DCO input until a command signal is developed and wherein the selector is thereafter operated to couple the summer signal to the DCO input;

a counter coupled to the DCO which produces an accessing signal from the clock signal;

N memories coupled to the counter, each of which stores a plurality of control signals for controlling at least one of the inverter switches for controlling at least one of the inverter switches to produce an inverter phase output voltage wherein the phase and frequency of the inverter output is dependent upon the accessing signal;

means for closing the controllable contactors to connect the inverter and the AC power source in parallel to the load bus when the magnitudes of the deviation signals are less than predetermined magnitudes; and means responsive to the closing means for opening one of the first and second controllable contactors to disconnect one of the inverter and the AC power source from the load bus after the two were connected in parallel.

3. A control for a variable-speed constant-frequency (VSCF) power generating system having a polyphase inverter including switches which are controlled to develop N phase output voltages and which is connectable to load bus through a first set of controllable contactors wherein a polyphase AC power source which develops N phase output voltages is also connectable to the load bus through a second set of controllable contactors, comprising:

first and second zero crossing detectors coupled to corresponding phase output voltages of the inverter and the AC power source;

first and second frequency sensors coupled to the zero crossing detectors which develop first and second frequency signals having magnitudes representing the inverter output voltage frequency and the AC power source output voltage frequency, respectively;

a first summer which sums the frequency signals to derive a frequency deviation signal having a magnitude representing the deviation of the inverter output voltage frequency from the AC power source output voltage frequency;

a phase detector which develops a phase deviation signal representing the deviation of the phase of the inverter output voltage from the phase of the AC power source output voltage;

an integrator coupled to the phase detector for integrating the phase deviation signal to produce an integrated phase deviation signal;

a second summer coupled to the first summer and the integrator which sums the frequency and integrated phase deviation signals to produce a summed signal;

a digitally controlled oscillator (DCO) coupled to the second summer which develops a clock signal at a frequency dependent upon the magnitude of the summed signal;

a counter coupled to the DCO which produces an accessing signal from the clock signal;

N memories coupled to the counter, each of which stores a plurality of control signals for controlling at least one of the inverter switches for controlling at least one of the inverter switches to produce an inverter phase output voltage wherein the phase and frequency of the inverter output is dependent upon the accessing signal;

means for closing the controllable contactors to connect the inverter and the AC power source in parallel to the load bus when the magnitudes of the deviation signals are less than predetermined magnitudes; and means responsive to the closing means for opening one of the first and second controllable contactors to disconnect one of the inverter and the AC power source from the load bus after the two were connected in parallel.

* * * * *